(12) United States Patent
Lecca et al.

(10) Patent No.: US 8,773,315 B2
(45) Date of Patent: Jul. 8, 2014

(54) METHOD FOR ESTIMATING THE POLARIZATION ELLIPTICITY OF AN ANTENNA RESPONSE SIGNAL TO AN INCIDENT ELECTROMAGNETIC WAVE

(75) Inventors: Arnaud Lecca, Colombes (FR); Eric Merlet, Colombes (FR); Jean-Christophe Mesnage, Colombes (FR); Jean-Luc Rogier, Colombes (FR)

(73) Assignee: Thales, Neuilly sur Seine (FR)

( * ) Notice: Subject to any disclaimer, the term of this patent is extended or adjusted under 35 U.S.C. 154(b) by 400 days.

(21) Appl. No.: 13/128,396

(22) PCT Filed: Nov. 4, 2009

(86) PCT No.: PCT/EP2009/064598
§ 371 (c)(1),
(2), (4) Date: Jul. 12, 2011

(87) PCT Pub. No.: WO2010/052235
PCT Pub. Date: May 14, 2010

(65) Prior Publication Data
US 2012/0127046 A1    May 24, 2012

(30) Foreign Application Priority Data
Nov. 7, 2008    (FR) ...................................... 08 06235

(51) Int. Cl.
*H01Q 1/24* (2006.01)
(52) U.S. Cl.
USPC .......................................... 343/703; 343/702
(58) Field of Classification Search
USPC ................................. 343/703, 702
See application file for complete search history.

(56) References Cited

U.S. PATENT DOCUMENTS 6,249,261 B1 *  6/2001  Solberg et al. ................ 343/801
2010/0149058 A1 *  6/2010  Bosshard et al. ............. 343/756

FOREIGN PATENT DOCUMENTS

DE    27 40 389 A1    3/1979
DE    29 25 723 A1    1/1981

OTHER PUBLICATIONS

E. Lertes, et al., "Watson-Watt-Peiler Mit Dreidimensionalem Rahnnen", Messen Prufen Automatisieren, Jun. 1, 1989, pp. 282-285, No. 6, Holzmann Verlag, Bad Worishofen, DE, XP000032843.
Lina Xu, et al., "Joint Parameter Estimation of Two-Dimensional Angle/Delay/Polarization for Multipath Channels", 4th IEEE International Conference on Circuits and System for Communications, May 26, 2008, pp. 737-740, IEEE, Piscataway, NJ, US, XP031268795.

* cited by examiner

*Primary Examiner* — Ahshik Kim
(74) *Attorney, Agent, or Firm* — Baker Hostetler LLP

(57) ABSTRACT

A method is provided for estimating the polarization ellipticity of an antenna response signal to an incident electromagnetic wave received on a crossed-loop antenna or an Adcock antenna array. The method comprises at least the following steps: measuring the phase offset $\Delta\phi$ between the signals acquired respectively on the cosine and sine path of the antenna; measuring the ratio R between the amplitudes of the signals acquired respectively on the cosine and sine path of the antenna; determining the ellipticity angle $\tau$ based on the phase offset $\Delta\phi$ and on the ratio R. The invention applies notably to the discrimination of ionospheric waves from ground and/or sea waves, in particular for a surveillance, eavesdropping, or goniometry system using HF band signals.

10 Claims, 5 Drawing Sheets

METHOD FOR ESTIMATING THE POLARIZATION ELLIPTICITY OF AN ANTENNA RESPONSE SIGNAL TO AN INCIDENT ELECTROMAGNETIC WAVE

CROSS-REFERENCE TO RELATED APPLICATIONS

This application is a National Stage of International patent application PCT/EP2009/064598, filed on Nov. 4, 2009, which claims priority to foreign French patent application No. FR 0806235, filed on Nov. 7, 2008, the disclosures of which are incorporated by reference in their entirety.

FIELD OF THE INVENTION

The present invention relates to a method for estimating the polarization ellipticity of an antenna response signal to an incident electromagnetic wave. The invention applies notably to the discrimination of ionospheric waves from ground and/or sea waves, in particular for a surveillance, eavesdropping, or goniometry system using HF band signals.

BACKGROUND

A large number of surveillance, eavesdropping, goniometry systems or, more generally, systems detecting and processing electromagnetic signals are used to process waves originating directly from transmitters on the ground. Sometimes, however, ionospheric waves interfere with their operation, whereby said waves may be mistaken for signals emitted by a transmitter on the ground.

Ionospheric waves can propagate over a long distance, in the order of several thousands of kilometers. Furthermore, when the radio waves produced by a transmitter penetrate the atmosphere as far as the ionosphere, they are continually subjected to refraction phenomena which cause part of the energy of said waves to return towards the earth. A portion of this energy can then be picked up by a receiver, even if the latter is very distant from the initial transmitter. If, for example, this receiver is used by a goniometer in order to determine the direction of signals originating from nearby transmitters, the received ionospheric waves may adversely affect the obtained angle measurements through interference. Furthermore, independently of any interference phenomenon, an initial vertical polarization wave is transformed following ionospheric propagation into any given polarization wave, and is therefore likely to cause the failure of any radiogoniometry device designed to operate in an optimum manner in the face of zero elevation and vertical polarization incident waves. This occurs, for example, in the case of "Watson-Watt" goniometry.

It is therefore desirable to distinguish ionospheric waves from sea and/or ground waves. Furthermore, in the case of goniometry measurements, it is desirable to evaluate the validity of said measurements according to the type of wave received by the goniometer antenna (ionospheric wave or ground/sea wave).

SUMMARY OF THE INVENTION

One object of the invention is to distinguish ionospheric waves from sea and/or ground waves. For this purpose, the subject matter of the invention is a method for estimating the polarization ellipticity $\tau$ of a response signal of a crossed-loop antenna or an Adcock antenna array in response to an incident electromagnetic wave received on said antenna, characterized in that it comprises at least the following steps:

measuring the phase offset $\Delta\phi$ between the signals acquired respectively on the cosine and sine path of the antenna;

measuring the ratio R between the amplitudes of the signals acquired respectively on the cosine and sine path of the antenna;

determining the ellipticity angle $\tau$ based on the phase offset $\Delta\phi$ and on the ratio R.

According to one embodiment of the method, said ellipticity angle $\tau$ is determined by the following relation:

$$\sin(2 \cdot \tau) = \frac{2}{R + \frac{1}{R}} \cdot \sin(\Delta\varphi)$$

where $$R = \frac{\|\bar{a}_c\|}{\|\bar{a}_s\|},$$

$\|\bar{a}_c\|$ being the amplitude of the signal received on the cosine loop, and $\|\bar{a}_s\|$ being the amplitude of the signal received on the sine loop.

The subject matter of the invention is also a method for discriminating ionospheric waves from sea and/or ground waves, comprising at least the following steps:

detecting an electromagnetic wave on a crossed-loop antenna or Adcock antenna array;

determining the polarization ellipticity angle $\tau$ of the antenna response signal to the received wave by carrying out the steps of the method described above;

testing the ellipticity angle value $\tau$: if its value is greater than a chosen threshold value, said wave is then classified as an ionospheric wave.

According to one embodiment of the method for discriminating ionospheric waves from sea and/or ground waves, if, at the end of the test of the ellipticity angle value $\tau$, the ellipticity value is less than the chosen threshold value, said wave is then classified as a ground and/or sea wave.

According to one embodiment of the method for discriminating ionospheric waves from sea and/or ground waves, if, at the end of the test of the ellipticity angle value $\tau$, this ellipticity value is less than the chosen threshold value, the detection step is then reiterated and the value of the deviation of the ellipticity angle $\tau$ is tested in a recurrent manner through time: if this deviation is greater than a second chosen threshold value, the wave is then classified as an ionospheric wave.

BRIEF DESCRIPTION OF THE DRAWINGS

The subject matter of the invention is also a device placed on the ground or in the sea, comprising a crossed-loop receive antenna or an Adcock antenna array and a processing module implementing the method for estimating the ellipticity angle $\tau$ as described above in order to determine the polarization ellipticity angle $\tau$ of a response signal of the antenna to an electromagnetic wave received by the receive antenna or the antenna array.

Other characteristics are explained in the following detailed description, provided by way of a non-limiting example and referring to the attached drawings, in which.

For the sake of clarity, the same references in different figures denote the same objects.

DETAILED DESCRIPTION

Figure 1A:
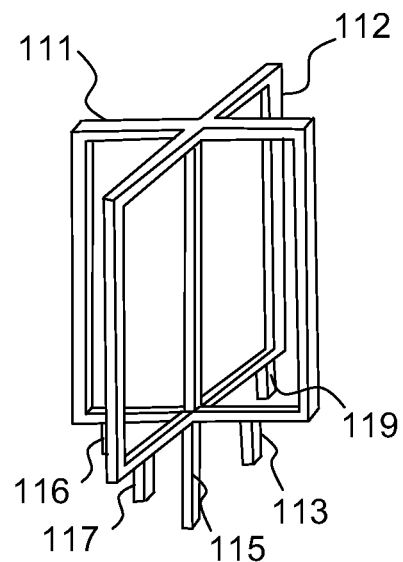
FIGS. 1a and 1b show a perspective and top view of a first example of a crossed-loop antenna receiving the signals processed by the method according to the invention.
Figure 1B:
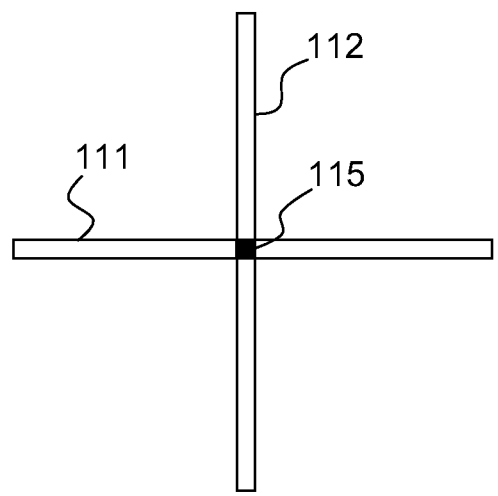

FIGS. 1a and 1b present a first example of a crossed-loop antenna receiving the signals processed by the angle measurement method according to the invention. FIG. 1a is a perspective view of the antenna, FIG. 1b showing the antenna seen from above.

The antenna 100 comprises a first loop 111 orthogonal to a second loop 112, the two loops 111, 112, being formed in the example by metal rectangles held up by a support 115 and set up in more or less vertical planes. The first loop 111 is sometimes referred to as the "sine loop", the second loop 112 being referred to as the "cosine loop". The antenna 100 comprises a third receive channel in the form, in the example, of a monopole antenna implemented with vertical metal bars 116, 117, 118, 119 placed under the loops 111, 112.

Figure 2A:
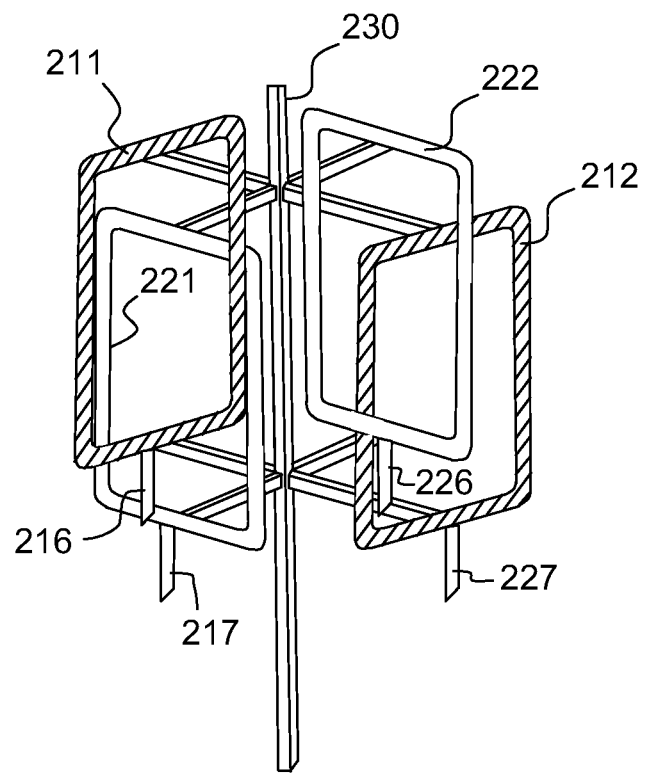
FIGS. 2a and 2b, show a perspective and top view of a second example of a crossed-loop antenna receiving the signals processed by the method according to the invention.
Figure 2B:
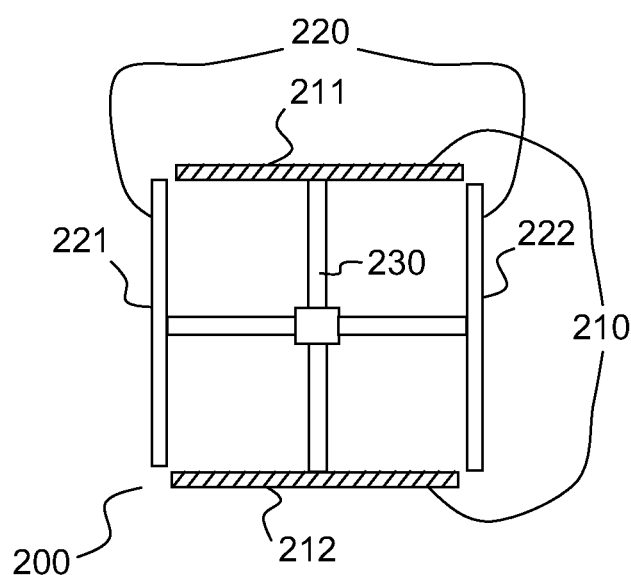

FIGS. 2a and 2b present a second example of a crossed-loop antenna receiving the signals processed by the angle measurement method according to the invention. FIG. 2a is a perspective view of the antenna, FIG. 2b showing the antenna seen from above.

The antenna 200 comprises two pairs 210, 220 of loops held up by a support 230, the loops of each pair 210, 220 being parallel with one another, the loops 211, 212 of the first pair 210 being orthogonal to the loops 221, 222 of the second pair 220, all of the loops 211, 212, 221, 222 of the antenna being, in the example, metal rectangles set up in more or less vertical planes. In the example, the pairs 210, 220 of loops are held up around the support 230 in such a way that they more or less form a square seen from above. In the example, the antenna also comprises, under each loop 211, 212, 221, 222, a metal bar 216, 217, 226, 227, which is more or less vertical, all of these bars 216, 217, 226, 227 forming the monopole channel of the antenna. From a theoretical point of view, this antenna is equivalent to the antenna shown in FIGS. 1a, 1b. The terms "sine loop" and "cosine loop" will be used below to refer to the first antenna model shown in FIGS. 1a, 1b, these terms being applied to the pairs 210, 220 of loops 211, 212, 221, 222 when the method is implemented on the second antenna model shown in FIGS. 2a, 2b.

According to a different embodiment of the method according to the invention, the crossed-loop antenna is replaced by an Adcock antenna array, this type of antenna array being able to be modeled in a manner analogous to the crossed-loop antennas, i.e. at least by a sine loop and a cosine loop.

Furthermore, the monopole of the antenna can be replaced by a dipole or any other antenna serving as a reference channel.

Figure 3A:
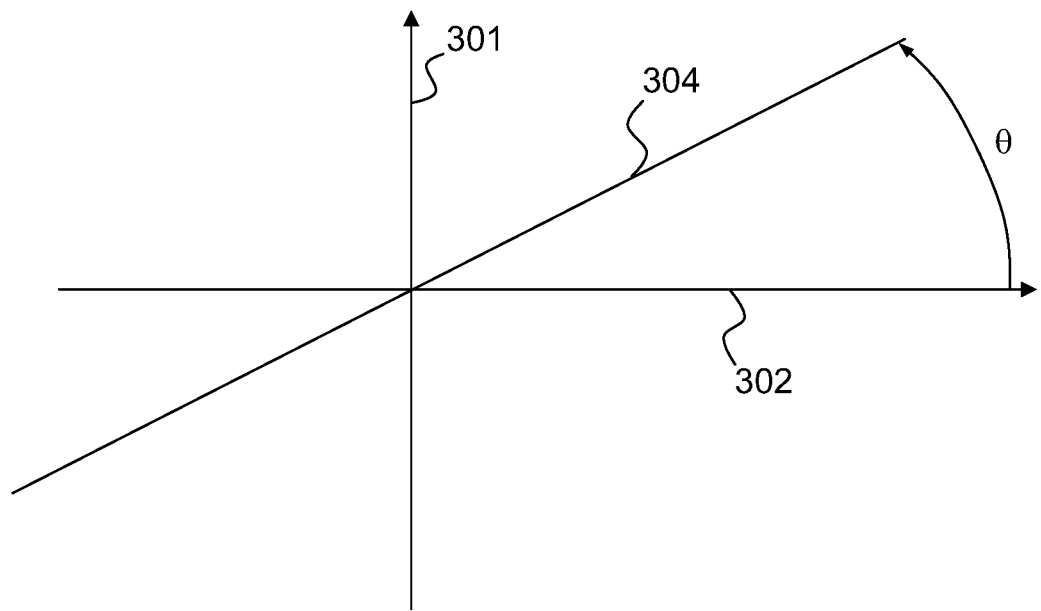
FIG. 3a is a graph illustrating a phase offset between signals received on the loops of the antenna when the carrier wave of said signals is vertically polarized.

FIG. 3a illustrates, by way of a graph, the phase offset between signals received on the loops of the antenna when the carrier wave of said signals is vertically polarized. The voltage received by the sine loop is shown on the y-axis 301, whereas the voltage received by the cosine loop is shown on the x-axis 302. The phase offset between the received signals is shown by a straight line 304.

Figure 3B:
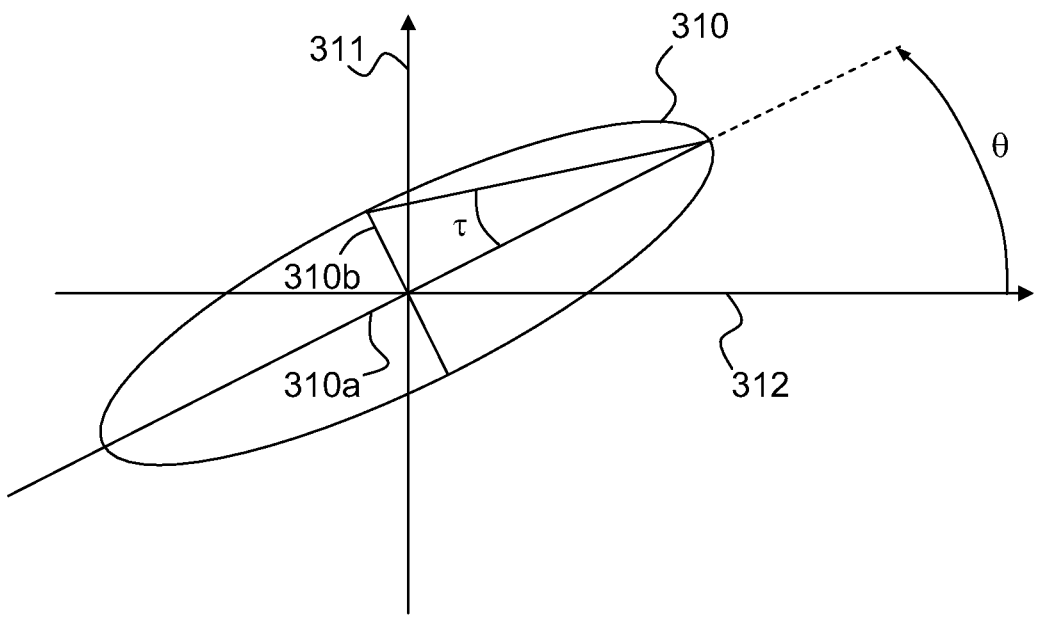
FIG. 3b is a graph illustrating a phase offset between signals received on the loops of the antenna when the carrier wave of said signals is not vertically polarized.

If the carrier wave of the signal is non-vertically polarized or has been subjected to the influence of reflectors close to the receive antenna, the signals received on the sine and cosine paths are provided with an additional phase offset, which causes an elliptical response of the loops, as shown in FIG. 3b.

FIG. 3b illustrates, by way of a graph, the phase offset between signals received on the loops of the antenna when the carrier wave of said signals is elliptically polarized. The voltage received by the sine loop is shown on the y-axis 311, whereas the voltage received by the cosine loop is shown on the x-axis 312. The phase offset between the received signals is shown by an ellipse 310.

The signal received on the monopole and the two cosine and sine loops of an antenna can then be expressed as follows:

$$\begin{cases} U_0(t) = \text{Re}(\beta \cdot s(t) \cdot e^{j\varpi t}) = \text{Re}(\bar{a}_0(t) \cdot e^{j\varpi t}) \\ U_c(t) = \text{Re}(\alpha \cdot s(t) \cdot \cos(\theta) \cdot e^{j\varpi t}) = \text{Re}(\bar{a}_c(t) \cdot e^{j\varpi t + \varphi_0 + \Delta\varphi}) \\ U_s(t) = \text{Re}(\alpha \cdot s(t) \cdot \sin(\theta) \cdot e^{j\varpi t}) = \text{Re}(\bar{a}_s(t) \cdot e^{j(\varpi t + \varphi_0)}) \end{cases}$$

where $U_0$, $U_c$ and $U_s$ denote the antenna output voltages on the monopole, on the cosine loop and on the sine loop respectively, s(t) denoting the modulating signal, ω denoting the carrier wave pulsation, the complex terms α and β being respectively dependent on the effective height of a loop and of the monopole, the terms $\bar{a}_0$, $\bar{a}_c$ and $\bar{a}_s$ denote the complex envelopes of the signals, $\phi_0$ denoting the phase difference between the sine loop and the monopole, Δφ denoting the phase offset between the signal received on the sine loop and the cosine loop, the phase offset Δφ being zero if the wave is vertically polarized. The coefficients α and β are determined during the calibration of the antenna in its usage environment by means of a vertically polarized, zero-incidence wave by comparing the response of the antenna with the theoretical response of the antenna (in cos(θ) and sin(θ) with α and β equal to 1).

Figure 4:
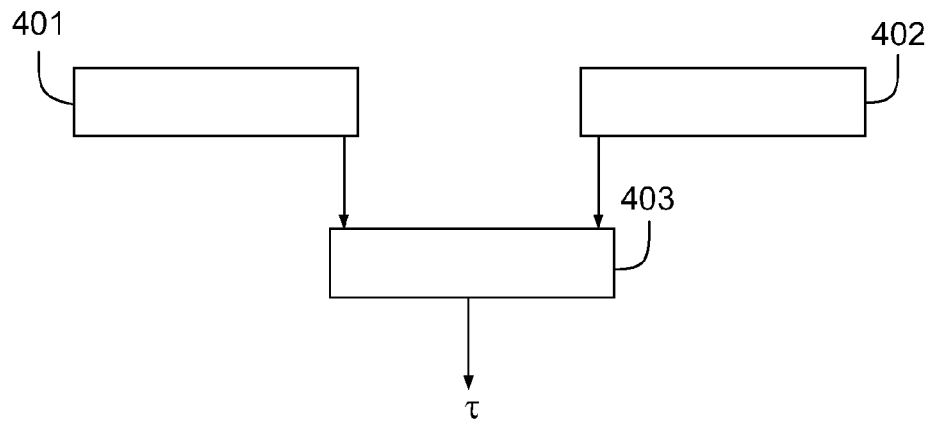
FIG. 4 is a synopsis presenting the steps of a first embodiment of the method according to the invention.

FIG. 4 shows, by way of a synopsis, the steps of a first embodiment of the method according to the invention. The method according to the invention estimates the polarization ellipticity angle τ of the antenna response signal to the received carrier wave.

In a first step 401, the phase offset Δφ between the response signal on the sine loop and cosine loop is measured. In parallel 402, the ratio between the amplitude $\|\bar{a}_c\|$ of the response signal on the cosine loop and the amplitude $\|\bar{a}_s\|$ of the signal on the sine loop is determined. In a second step 403, the input angle of incline of the carrier wave of the signals is determined on the basis of the phase offset Δφ and the ratio R between $\|\bar{a}_c\|$ and $\|\bar{a}_s\|$. The input angle of incline τ can in fact be expressed as a function of these two values Δφ and R as follows:

$$\sin(2 \cdot \tau) = \frac{2 \cdot \|\bar{a}_c\| \cdot \|\bar{a}_s\|}{\|\bar{a}_c\|^2 + \|\bar{a}_s\|^2} \cdot \sin(\Delta\varphi) = \frac{2}{\frac{\|\bar{a}_c\|}{\|\bar{a}_s\|} + \frac{\|\bar{a}_s\|}{\|\bar{a}_c\|}} \cdot \sin(\Delta\varphi)$$

Figure 5:
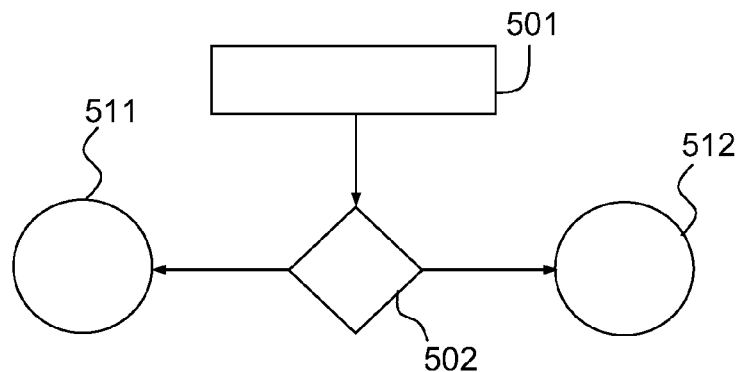
FIG. 5 is a synopsis presenting a first method using the method according to the invention to discriminate ionospheric waves from ground and/or sea waves.

The ellipticity angle value τ calculated in this way may, for example, allow the ionospheric waves to be distinguished from the sea and/or ground waves, as shown in FIG. 5.

FIG. 5 presents, by way of a synopsis, a method using the method according to the invention to discriminate ionospheric waves from ground and/or sea waves.

A first step 501 of estimation of the ellipticity angle τ is followed by a test step 502 comparing the estimated angle τ with a predefined threshold. If the angle value τ exceeds the threshold, the wave is considered to be an ionospheric wave

511. If the angle value τ does not exceed the defined threshold, the wave is considered to be a sea and/or ground wave 512.

Thus, thanks to the method according to the invention, it becomes easy to avoid performing processing operations on the ionospheric waves received by an antenna if, for example, these waves are considered as interference and produce inconsistent measurements.

Figure 6:
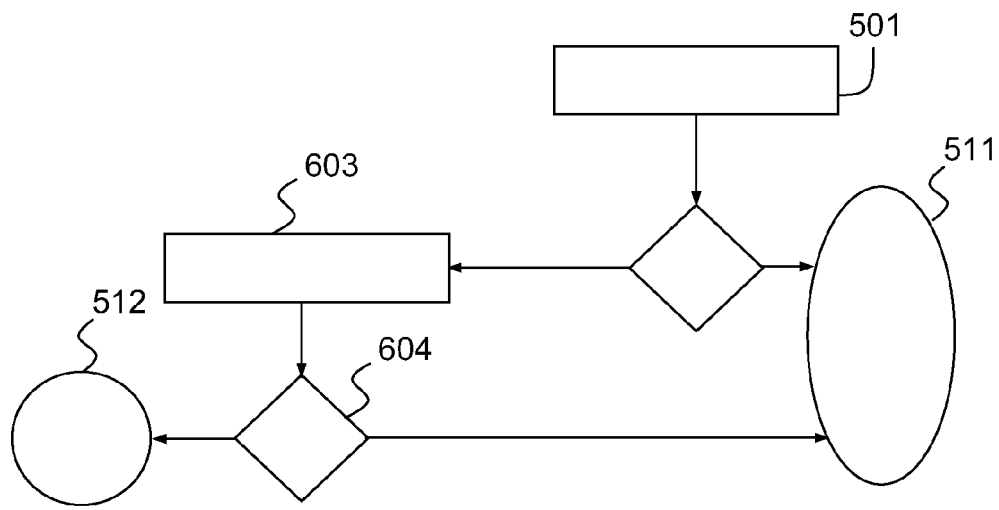
FIG. 6 is a synopsis presenting a second method, derived from the first method shown in FIG. 5, for discriminating ionospheric waves from ground and/or sea waves.

FIG. 6 shows a second method, derived from the first method shown in FIG. 5, for discriminating ionospheric waves from ground and/or sea waves.

A first step 501 of estimation of the ellipticity angle τ is followed by a first test step 502 comparing the estimated angle τ with a first threshold. If the angle value exceeds this first threshold, the wave is considered to be an ionospheric wave 511, if not, a tracking step 603 is carried out.

This tracking step 603 allows the ellipticity angle value τ to be followed through time. A second test step 604 then makes it possible to determine, on the basis of the deviation of the ellipticity angle value, whether the wave is an ionospheric wave 511. In the example, this second test step 604 considers the wave to be an ionospheric wave 511 if the deviation through time of the ellipticity angle value τ exceeds a second threshold. If not, the wave is considered to be a ground and/or sea wave 512.

Figure 7:
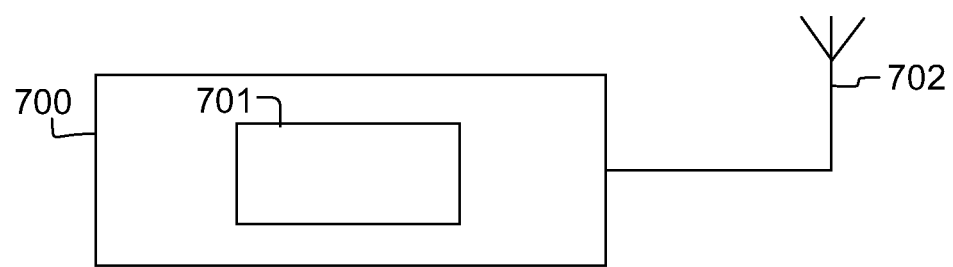
FIG. 7 is an illustration of a device implementing the method for estimating the ellipticity angle τ according to the invention.

As shown in FIG. 7, the method for estimating the ellipticity angle τ according to the invention can be implemented in a device placed on the ground or in the sea. The device 700 comprises a processing module 701 which allows said ellipticity angle τ to be estimated on the basis of signals received by an antenna 702. The device can thus be used, for example, to discriminate ionospheric waves from ground and/or sea waves.

The method for estimating the ellipticity angle τ according to the invention can also allow a quality rating to be assigned to a goniometry measurement. In fact, if goniometry measurements are to be carried out on signals originating from transmitters on the ground, the reception of an ionospheric wave may interfere with the measurements. Thus, a decreasing quality rating based on the antenna response ellipticity value τ can be assigned. The goniometry measurements carried out on emissions considered to be ionospheric can then be excluded.

The invention claimed is:

1. A method for estimating a polarization ellipticity angle τ of a response signal of a crossed-loop antenna or an Adcock antenna array in response to an incident electromagnetic wave received on said antenna, the method comprising:
    measuring a phase offset Δφ between signals acquired on the cosine and sine path of the antenna;
    measuring a ratio R between amplitudes of the signals acquired on the cosine and sine path of the antenna; and
    determining the polarization ellipticity angle τ based on the phase offset Δφ and on the ratio R.

2. A method for estimating a polarization ellipticity angle τ of a response signal of a crossed-loop antenna or an Adcock antenna array in response to an incident electromagnetic wave received on said antenna, the method comprising:
    measuring a phase offset Δφ between signals acquired on the cosine and sine path of the antenna;
    measuring a ratio R between amplitudes of the signals acquired on the cosine and sine path of the antenna; and
    determining the polarization ellipticity angle τ by the following relation:

$$\sin(2 \cdot \tau) = \frac{2}{R + \frac{1}{R}} \cdot \sin(\Delta\varphi)$$

wherein $$R = \frac{\|\bar{a}_c\|}{\|\bar{a}_s\|},$$

$\|\bar{a}_c\|$ is the amplitude of the signal acquired on the cosine loop, and
$\|\bar{a}_s\|$ is the amplitude of the signal acquired on the sine loop.

3. A method for discriminating ionospheric waves from sea or ground waves, the method comprising:
    detecting an electromagnetic wave on a crossed-loop antenna or Adcock antenna array;
    measuring a phase offset Δφ between signals acquired on the cosine and sine path of the antenna;
    measuring a ratio R between amplitudes of the signals acquired on the cosine and sine path of the antenna;
    determining a polarization ellipticity angle τ of an antenna response signal to the detected wave based on the phase offset Δφ and on the ratio R;
    comparing the polarization ellipticity angle value τ to a predetermined threshold value; and
    classifying said wave as an ionospheric wave if the polarization ellipticity angle value τ is greater than the predetermined threshold value.

4. The method for discriminating ionospheric waves from sea or ground waves as claimed in claim 3, further comprising:
    classifying said wave as a ground or sea wave if the polarization ellipticity value τ is less than the predetermined threshold value.

5. The method for discriminating ionospheric waves from sea or ground waves as claimed in claim 3, further comprising:
    if the polarization ellipticity value τ is less than the predetermined threshold value:
        detecting a second electromagnetic wave on the antenna;
        determining a second polarization ellipticity angle τ of an antenna response signal to the detected second wave;
        determining a deviation between the second polarization ellipticity angle and the polarization ellipticity angle;
        comparing the deviation to a second predetermined threshold value; and
        classifying the wave as an ionospheric wave if the deviation is greater than the second predetermined threshold value.

6. A device placed on the ground or in the sea, the device comprising a crossed-loop receive antenna or an Adcock antenna array and a processing module, the processing module configured to determine a polarization ellipticity angle τ of a response signal of the antenna to an electromagnetic wave received by the antenna by:
    measuring a phase offset Δφ between signals acquired on the cosine and sine path of the antenna;
    measuring a ratio R between amplitudes of the signals acquired on the cosine and sine path of the antenna; and
    determining the polarization ellipticity angle τ based on the phase offset Δφ and on the ratio R.

7. The method for discriminating ionospheric waves from sea or ground waves according to claim 3, wherein said polarization ellipticity angle value τ is determined by the following relation:

$$\sin(2 \cdot \tau) = \frac{2}{R + \frac{1}{R}} \cdot \sin(\Delta\varphi),$$

wherein $$R = \frac{\|\bar{a}_c\|}{\|\bar{a}_s\|},$$

$\|\bar{a}_c\|$ is the amplitude of the signal acquired on the cosine loop, and $\|\bar{a}_s\|$ is the amplitude of the signal acquired on the sine loop.

8. The method for discriminating ionospheric waves from sea or ground waves according to claim 4, wherein said polarization ellipticity angle value $\tau$ is determined by the following relation:

$$\sin(2\cdot\tau) = \frac{2}{R+\frac{1}{R}}\cdot\sin(\Delta\varphi),$$

wherein $$R = \frac{\|\bar{a}_c\|}{\|\bar{a}_s\|},$$

$\|\bar{a}_c\|$ is the amplitude of the signal acquired on the cosine loop, and $\|\bar{a}_s\|$ is the amplitude of the signal acquired on the sine loop.

9. The method for discriminating ionospheric waves from sea or ground waves according to claim 5, wherein said polarization ellipticity angle value $\tau$ is determined by the following relation:

$$\sin(2\cdot\tau) = \frac{2}{R+\frac{1}{R}}\cdot\sin(\Delta\varphi),$$

wherein $$R = \frac{\|\bar{a}_c\|}{\|\bar{a}_s\|},$$

$\|\bar{a}_c\|$ is the amplitude of the signal acquired on the cosine loop, and $\|\bar{a}_s\|$ is the amplitude of the signal acquired on the sine loop.

10. The device placed on the ground or in the sea according to claim 6, wherein said processing module is further configured to determine the polarization ellipticity angle value $\tau$ by the following relation:

$$\sin(2\cdot\tau) = \frac{2}{R+\frac{1}{R}}\cdot\sin(\Delta\varphi),$$

wherein $$R = \frac{\|\bar{a}_c\|}{\|\bar{a}_s\|},$$

$\|\bar{a}_c\|$ is the amplitude of the signal acquired on the cosine loop, and $\|\bar{a}_s\|$ is the amplitude of the signal acquired on the sine loop.

* * * * *